US012748279B2

(12) United States Patent
Fan

(10) Patent No.: US 12,748,279 B2
(45) Date of Patent: Sep. 29, 2026

(54) AUTOMATIC FOCUSING SYSTEM

(71) Applicant: SHENZHEN CUTTYLIGHT TECHNOLOGY CO., LTD., Shenzhen (CN)

(72) Inventor: Simin Fan, Shenzhen (CN)

(73) Assignee: SHENZHEN CUTTYLIGHT TECHNOLOGY CO., LTD., Shenzhen (CN)

( * ) Notice: Subject to any disclaimer, the term of this patent is extended or adjusted under 35 U.S.C. 154(b) by 288 days.

(21) Appl. No.: 18/431,822

(22) Filed: Feb. 2, 2024

(65) Prior Publication Data

US 2024/0176101 A1 May 30, 2024

Related U.S. Application Data

(63) Continuation of application No. PCT/CN2022/110876, filed on Aug. 8, 2022.

(30) Foreign Application Priority Data

Aug. 17, 2021 (CN) ......................... 202110941041.0

(51) Int. Cl.
*G02B 7/34* (2021.01)

(52) U.S. Cl.
CPC ...................................... *G02B 7/34* (2013.01)

(58) Field of Classification Search
CPC . G02B 7/34; G02B 7/32; G02B 21/06; G02B 21/0032; G02B 21/245;
(Continued)

(56) References Cited

U.S. PATENT DOCUMENTS 4,800,547 A 1/1989 Kessels et al.
5,019,701 A 5/1991 Yagoto et al.
(Continued)

FOREIGN PATENT DOCUMENTS

CN 101187783 A 5/2008
CN 103217873 A 7/2013
(Continued)

OTHER PUBLICATIONS

International Search Report and Written Opinion issued in corresponding PCT Application No. PCT/CN2022/110876, dated Oct. 25, 2022.

(Continued)

*Primary Examiner* — Ephrem Z Mebrahtu
(74) *Attorney, Agent, or Firm* — Westbridge IP LLC

(57) ABSTRACT

Disclosed is an automatic focusing system. The illumination system is configured to generate two illumination beams directed toward the characteristic signal generation system. The characteristic signal generation system includes two transparent gratings with regular periods. The two illumination beams respectively pass through the two transparent gratings to form two transparent grating image beams which are directed to the TIR prism and the objective lens at different angles. The two transparent grating image beam after passing through the objective lens interfere on an object surface to form a moiré fringe image which is captured by the imaging system. The processor is configured to determine a defocus direction and a defocus amount according to a position of the moiré fringe image captured by the imaging system and further to determine an adjustment amount of a position of an objective lens according to the defocus direction and the defocus amount.

7 Claims, 3 Drawing Sheets

(58) Field of Classification Search
CPC ........... G02B 21/241; G02B 7/28; G01J 9/00; G01B 11/254
See application file for complete search history.

(56) References Cited

U.S. PATENT DOCUMENTS

| | | | | |
|---|---|---|---|---|
| 5,856,669 | A | 1/1999 | Nagasaka et al. | |
| 5,963,531 | A | 10/1999 | Takahashi | |
| 6,657,216 | B1 * | 12/2003 | Poris | G01B 11/0608 250/559.22 |
| 2005/0219553 | A1 | 10/2005 | Kelly et al. | |
| 2010/0033811 | A1 | 2/2010 | Westphal et al. | |
| 2011/0134308 | A1 | 6/2011 | Arnz et al. | |
| 2013/0342902 | A1 | 12/2013 | Krueger et al. | |
| 2021/0199587 | A1 * | 7/2021 | Prince | G01N 21/6458 |
| 2021/0254968 | A1 * | 8/2021 | Zhang | G01B 11/002 |

FOREIGN PATENT DOCUMENTS

| | | | | |
|---|---|---|---|---|
| CN | 112904526 | A | | 6/2021 |
| CN | 113687492 | A | | 11/2021 |
| CN | 216160901 | U | | 4/2022 |
| JP | H10221013 | A | * | 8/1998 |

OTHER PUBLICATIONS

First Office Action issued in counterpart Chinese Patent Application No. 202110941041.0, dated Dec. 10, 2024.

* cited by examiner

AUTOMATIC FOCUSING SYSTEM

CROSS-REFERENCE TO RELATED APPLICATIONS

This application is a continuation application of International Application No. PCT/CN2022/110876, filed on Aug. 8, 2022, which claims priority to Chinese Patent Application No. 202110941041.0, filed on Aug. 17, 2021. The disclosures of the above-mentioned applications are incorporated herein by reference in their entireties.

TECHNICAL FIELD

The present application relates to the technical field of optics, and in particular to an automatic focusing system.

BACKGROUND

As the resolution of lenses in modern industry develops toward microns, submicrons, and nanometers, the depth of focus of lenses is getting smaller and smaller, and modern industry has higher and higher requirements for production efficiency. The autofocus system came into being.

Autofocus technology is roughly divided into two categories: for the first category, the image contrast of the imaged object is directly calculated to find the lens position with the highest contrast; for the second category, a specialized autofocus system is needed. The first category requires predicting the direction of focusing movement, which does not meet the efficiency requirements of modern industry, so the second focusing method is generally used.

The existing automatic focusing method makes judgments based on the different spot shapes of the semi-conical beam on the focusing surface, before and after focusing. When focusing out of focus (before focusing), the laser spot appears as a semicircle on the left; when focusing in focus (after focusing), the laser spot appears as a semi-circle on the right; at the focus, the laser beam theoretically converges to a point. This is theoretically true. In actual operation, when the lens gradually defocuses from the focus position, the shape of the laser beam changes slowly. Since the aperture of the semi-conical beam only accounts for half of the aperture of the microscope, that is, the focal depth of the focus signal is greater than the focal depth of the objective lens and cannot adequately reflect the degree of defocus of the object.

The above content is only used to assist in understanding the technical solutions of the present application, and does not represent an admission that the above content is related art.

SUMMARY

The main purpose of the present application is to provide an automatic focusing system, aiming to solve the technical problem of inaccurate focusing and imaging in the existing technology.

In order to achieve the above purpose, the automatic focusing system provided by the present application includes an illumination system, a characteristic signal generation system, a total internal reflection (TIR) prism, an objective lens, an imaging system and a processor. The illumination system is configured to generate two illumination beams directed toward the characteristic signal generation system. The characteristic signal generation system includes two transparent gratings with regular periods. The two illumination beams respectively pass through the two transparent gratings to form two transparent grating image beams, the two transparent grating image beams are directed to the TIR prism, the two transparent grating image beams passing through the TIR prism are directed to the objective lens at different angles, and the two transparent grating image beams after passing through the objective lens interfere on an object surface to form a moiré fringe image. The imaging system is configured to capture the moiré fringe image. The processor is configured to determine a defocus direction of the automatic focusing system and a defocus amount of the automatic focusing system according to a position of the moiré fringe image captured by the imaging system and further to determine an adjustment amount of a position of the objective lens according to the defocus direction and the defocus amount.

In the automatic focusing system provided by the present application, the illumination system generates two illumination beams directed to the characteristic signal generation system, and the characteristic signal generation system includes two transparent gratings with regular periods, so that the two illumination beams pass through the transparent gratings to form two transparent grating image beams. The two transparent grating image beams are reflected by the TIR prisms and enter the objective lens at different angles, thereby causing interference on the object surface, forming moiré fringes. Since the moiré fringes amplify small relative displacements, the smaller the relative angle, the greater the magnification of the moiré fringe displacement. According to the different positions of the moiré fringes, the processor can more accurately give the defocus direction and defocus amount, so that the focus adjustment process is more accurate.

In some embodiments, the automatic focusing system further includes an execution system. The processor is configured to generate an adjustment command according to the adjustment amount and send the adjustment command to the execution system; and the execution system is configured to adjust the position of the objective lens according to the adjustment command.

In some embodiments, the illumination system includes an illumination source, an illumination lens, a first reflector, a second reflector and a third reflector. After a light beam emitted by the illumination source passes through the illumination lens, a part of the light beam is reflected by the first reflector and the second reflector in turn to form an illumination beam directed to one of the transparent gratings, while the other part of the light beam is reflected by the third reflector to form another illumination beam directed to the other transparent grating. An aperture of each illumination beam is less than or equal to half of an aperture of the objective lens.

In some embodiments, the automatic focusing system further includes a fourth reflector and a dichroic mirror. After being reflected by the fourth reflector and the dichroic mirror in turn, the transparent grating image beams are directed to the objective lens.

In some embodiments, the dichroic mirror is a beam splitter or a dichroscope with a light splitting ratio of 50/50.

In some embodiments, the automatic focusing system further includes a first beam splitter. The imaging system includes a first tube lens and a first camera; after passing through the TIR prism, the first beam splitter and the first tube lens in turn, the two transparent grating image beams are directed to the fourth reflector, and after passing through the objective lens, the dichroic mirror, the fourth reflector, and the first beam splitter in turn, the moiré fringe image generated on the object surface is incident on a photosensitive surface of the first camera.

In some embodiments, the automatic focusing system further includes an imaging light source, a second beam splitter, a second tube lens and a second camera. A light beam emitted by the imaging light source is reflected by the second beam splitter and directed to the dichroic mirror; the dichroic mirror is configured to perform spectroscopic processing on the illumination beams and direct the illumination beams to the objective lens, the illumination beams passing through the objective lens is projected on the object surface for illuminating an object to be detected on the object surface; and the object to be detected reflects the illumination beams to form a reflected light, and the reflected light converges to the second camera after passing through the objective lens, the dichroic mirror, the second beam splitter and the second tube lens in turn.

In some embodiments, a splitting ratio of the second beam splitter is 50/50.

BRIEF DESCRIPTION OF THE DRAWINGS

In order to more clearly illustrate the technical solutions in some embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
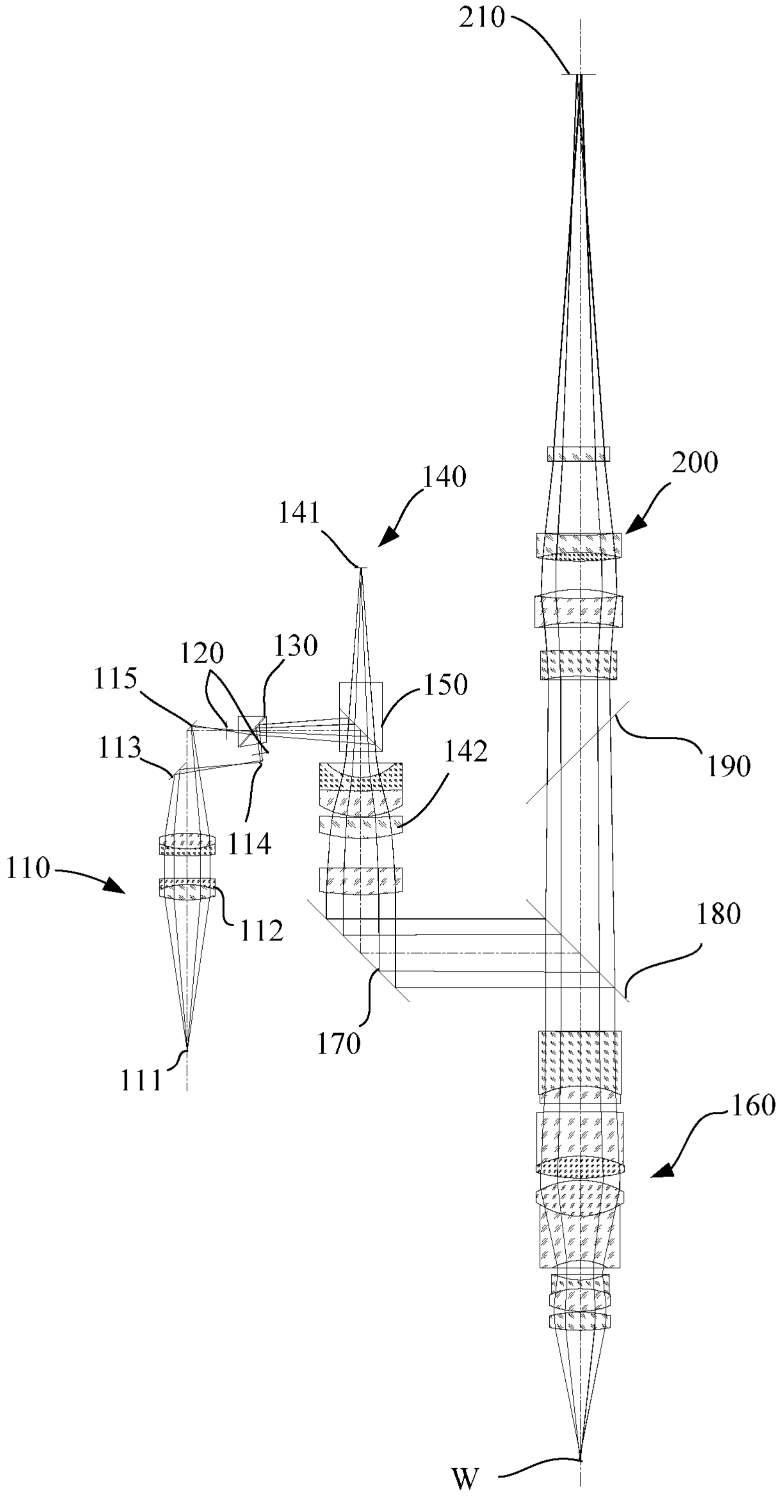
FIG. 1 is a schematic structural view of an automatic focusing system according to some embodiments of the present application.

The implementation of the purpose, functional characteristics and advantages of the present application will be further described with reference to the attached drawings and in combination with embodiments.

DETAILED DESCRIPTION OF THE EMBODIMENTS

The technical solutions of embodiments of the present application will be clearly and completely described with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that if there are directional indications (such as up, down, left, right, front, rear, etc.) in the present application, the directional indications are only used to explain the relative positional relationship, movement situation, etc. among components in a specific attitude (as shown in the drawings). If the specific attitude changes, the directional indication also changes accordingly.

In addition, the descriptions related to "first", "second" and the like in the present application are merely for descriptive purposes, and should not be understood as indicating or implying their relative importance or implicitly indicating the number of technical features indicated. Therefore, the features defined by "first" and "second" may explicitly or implicitly include at least one such feature. In addition, "and/or" in the whole text includes three solutions, taking A and/or B as an example, including A technical solution, or B technical solution, or a technical solution that both A and B meet. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

Figure 2:
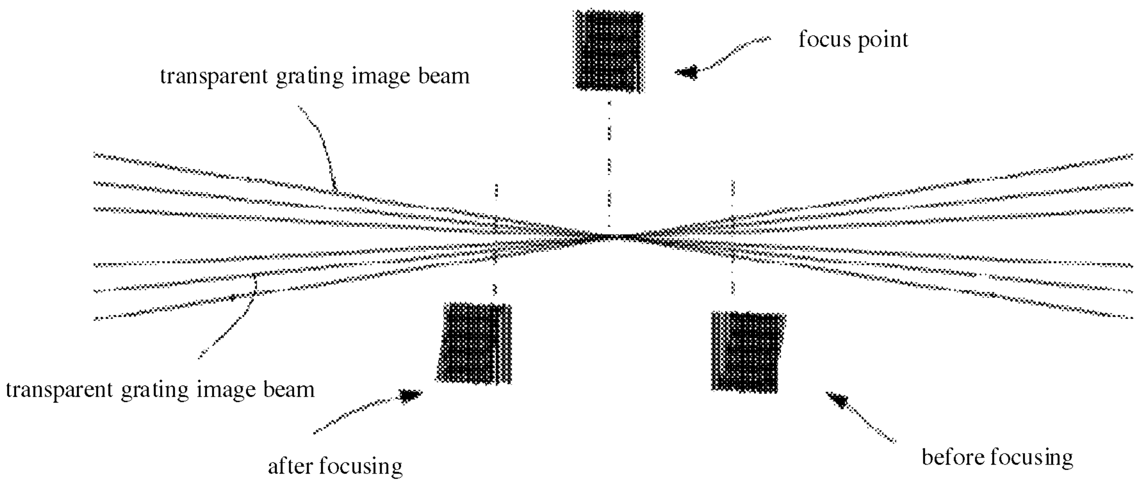
FIG. 2 is a schematic view of an application scenario of the automatic focusing system in FIG. 1.
Figure 3:
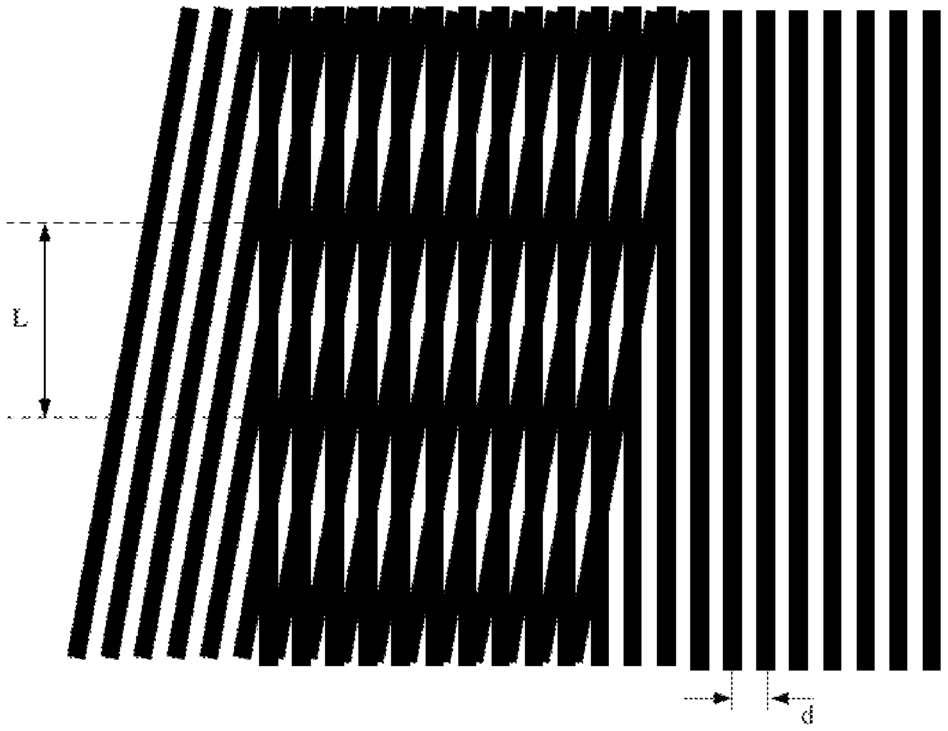
FIG. 3 is a schematic view of the principle of the automatic focusing system in FIG. 1.

As shown in FIG. 1 to FIG. 3, in some embodiments, the automatic focusing system provided in the present application includes an illumination system 110, a characteristic signal generation system (not shown in drawings), a total internal reflection (TIR) prism 130, an objective lens 160, an imaging system 140 and a processor (not shown in drawings). The illumination system 110 is configured to generate two illumination beams directed toward the characteristic signal generation system. The characteristic signal generation system includes two transparent gratings 120 with regular periods. The two illumination beams respectively pass through the two transparent gratings 120 to form two transparent grating image beams, which are directed to the TIR prism 130. The two transparent grating image beams passing through the TIR prism 130 are directed to the objective lens 160 at different angles, and the two transparent grating image beam after passing through the objective lens 160 interfere on an object surface W to form a moiré fringe image. The imaging system 140 is configured to capture the moiré fringe image. The processor is configured to determine a defocus direction of the automatic focusing system and a defocus amount of the automatic focusing system according to a position of the moiré fringe image captured by the imaging system 140 and further to determine an adjustment amount of the position of the objective lens 160 according to the defocus direction and the defocus amount.

In the automatic focusing system provided in the present application, the illumination system 110 is configured to generate two illumination beams directed to the characteristic signal generation system, and the characteristic signal generation system includes two transparent gratings 120 with regular periods, so that the two illumination beams pass through the transparent grating 120 to form two transparent grating image beams. The two transparent grating image beams enter the objective lens 160 at different angles through the action of the TIR prism 130, and then interferes on the object surface W to form a moiré fringe. Since the moiré fringe amplifies small relative displacements, the smaller the relative angle, the greater the magnification of the moiré fringe displacement. According to the different positions of the moiré fringe, the processor can more accurately provide the defocus direction and defocus amount, so that the focus adjustment process is more accurate.

In some embodiments, the automatic focusing system further includes an execution system. The processor is configured to generate an adjustment command according to the adjustment amount and sends the adjustment command to the execution system; and the execution system is configured to adjust a position of the objective lens 160 according to the adjustment command. The execution system has at least three adjustment dimensions, including x-direction rotation adjustment and y-direction rotation adjustment for automatic leveling; z-direction movement adjustment for automatic focusing. The execution system includes components such as servo motors and transmission mechanisms, which can refer to the existing structural design and will not be described again here. The automatic focusing system of the present application can adapt to the automatic adjustment requirements during industrial production through the execution system.

In some embodiments, the illumination system 110 includes an illumination source 111, an illumination lens 112, a first reflector 113, a second reflector 114 and a third reflector 115. After a light beam emitted by the illumination source 111 passes through the illumination lens 112, a part of the light beam is reflected by the first reflector 113 and the second reflector 114 in turn to form an illumination beam directed to one of the transparent gratings 120, while the other part of the light beam is reflected by the third reflector 115 to form another illumination beam directed to the other transparent grating 120. An aperture of each illumination beam is less than or equal to half of an aperture of the objective lens 160. As shown in FIG. 1, The illumination lens 112 of the present application is a lens group composed of at least two lenses, which can improve the light quality. The TIR prism 130 includes two triangular prisms to form a total reflection prism. The first reflector 113 and the third reflector 115 are respectively provided in both sides of the optical axis of the illumination lens 112 to respectively direct each half of the light beam emitted by the illumination lens 112 to a triangular prism in the TIR prism 130 at different angles. As can be seen in FIG. 1, a transparent grating 120 is provided between the third reflector 115 and the triangular prism. An illumination beam passes through the transparent grating 120 to form a transparent grating image beam that is incident vertically through the right-angled surface of the triangular prism at a vertical angle, so that in principle all the light beam of the transparent grating image can passes through. Another transparent grating 120 is provided between the second reflector 114 and another triangular prism. After the other illumination beam passes through the transparent grating 120, another transparent grating image beam is formed and directed to the inclined plane of another triangular prism at an oblique angle. The transparent grating image beam is totally reflected by the TIR prism 130. Through the above settings, the light loss of the illumination source 111 during the formation of the two transparent grating image beams is less. In addition, in the present application, the technical solution only requires one illumination source 111 to implement, which greatly simplifies the structure of the entire automatic focusing system and reduces costs. Moreover, the requirements for the illumination source 111 are not too high, which makes it easier to apply the system to industry. In production, it is more practical. Certainly, regardless of factors such as installation space and cost, the illumination system 110 of the present application can also adopt the form of two illumination sources 111 and multiple illumination lenses 112 to form two illumination beams, and this application does not limit this.

In some embodiments, the automatic focusing system further includes a fourth reflector 170 and a dichroic mirror 180. After being reflected by the fourth reflector 170 and the dichroic mirror 180 in turn, the transparent grating image beams are directed to the objective lens 160. In some embodiments, the dichroic mirror 180 is a beam splitter or dichroscope with a light splitting ratio of 50/50. Through the arrangement of the fourth reflector 170 and the dichroic mirror 180 in the present application, the space utilization rate of the entire automatic focusing system can be higher, and the overall structure can be made more compact, thereby better adapting to the installation requirements of industrial production.

In some embodiments, the imaging system 140 includes a first tube lens 142 and a first camera 141. The automatic focusing system further includes a first beam splitter 150. The two transparent grating image beams emitted through the TIR prism 130 pass through the first beam splitter 150 and the first tube lens 142 in turn before being directed to the fourth reflector 170. After passing through the objective lens 160, the dichroic mirror 180, the fourth reflector 170, and the first beam splitter 150 in turn, the moiré fringe image generated on the object surface W is incident on a photosensitive surface of the first camera 141. The transparent grating 120 is located on the object surface W of the first tube lens 142. The automatic focusing system of the present application is provided with this optical path, making the overall structure more compact and the imaging effect better.

In some embodiments, the automatic focusing system further includes an imaging light source (not shown in drawings), a second beam splitter 190, a second tube lens 200 and a second camera 210.

A light beam emitted by the imaging light source is reflected by the second beam splitter 190 and directed to the dichroic mirror 180. The dichroic mirror 180 is configured to perform spectroscopic processing on the illumination beams and directs the illumination beams to the objective lens 160, the illumination beams passing through the objective lens 160 is projected on the object surface W for illuminating an object to be detected on the object surface W. The object to be detected reflects the illumination beams to form a reflected light, and the reflected light converges to the photosensitive surface of the second camera 210 after passing through the objective lens 160, the dichroic mirror 180, the second beam splitter 190 and the second tube lens 200 in turn. In some embodiments, a splitting ratio of the second beam splitter 190 is 50/50. The automatic focusing system of the present application can also detect objects on the object surface W, making the entire system more powerful.

As shown in FIG. 2, combined with the above content, the automatic focusing system of the present application has the above structure. In the application scenario, when the object surface W is in focus, the moiré fringe formed is shifted to left in the image of the transparent grating 120. When the object surface W is out of focus, the moiré fringe formed is shifted to the right in the image of the transparent grating 120. When the object surface W is at the focus, the moiré fringe formed is in the centre position of the image of the transparent grating 120. In this way, the processor can very clearly determine the defocus direction of the object surface W.

As shown in FIG. 3, the relationship between the spacing L of the moiré fringe and the grating pitch d of the transparent grating 120 is:

$L=d/\sin(\theta)$, where θ represents the angle between images of the two transparent gratings 120.

When θ is small, the above formula can be simplified to: $L=d/\theta$, where θ is expressed in radians.

When the grating moves a distance Δd, ΔL represents the moiré fringe movement and K represents the moiré fringe movement amplification factor, then K is calculated by the following formula:

$$K=\Delta L/\Delta d=1/\theta. \text{ When } \theta=3^\circ, K=19.$$

From the above, it's known that the relative movement of the images of the two transparent gratings 120 is amplified by the moiré fringe, and is imaged by the first tube lens 142 to the first camera 141, thereby ensuring more accurate focusing.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. An automatic focusing system, comprising an illumination system, a characteristic signal generation system, a total internal reflection (TIR) prism, an objective lens, an imaging system and a processor;

wherein the illumination system is configured to generate two illumination beams directed toward the characteristic signal generation system;

the characteristic signal generation system comprises two transparent gratings with regular periods;

the two illumination beams respectively pass through the two transparent gratings to form two transparent grating image beams, the two transparent grating image beams are directed to the TIR prism, the two transparent grating image beams passing through the TIR prism are directed to the objective lens at different angles, and the two transparent grating image beams after passing through the objective lens interfere on an object surface to form a moiré fringe image;

the imaging system is configured to capture the moiré fringe image;

the processor is configured to determine a defocus direction of the automatic focusing system and a defocus amount of the automatic focusing system according to a position of the moiré fringe image captured by the imaging system and further to determine an adjustment amount of a position of the objective lens according to the defocus direction and the defocus amount;

the illumination system comprises an illumination source, an illumination lens, a first reflector, a second reflector and a third reflector;

after a light beam emitted by the illumination source passes through the illumination lens, a part of the light beam is reflected by the first reflector and the second reflector in turn to form an illumination beam directed to one of the transparent gratings, while the other part of the light beam is reflected by the third reflector to form another illumination beam directed to the other transparent grating; and an aperture of each illumination beam is less than or equal to half of an aperture of the objective lens.

2. The automatic focusing system of claim 1, further comprising an execution system;

wherein the processor is configured to generate an adjustment command according to the adjustment amount and send the adjustment command to the execution system; and the execution system is configured to adjust the position of the objective lens according to the adjustment command.

3. The automatic focusing system of claim 1, further comprising a fourth reflector and a dichroic mirror;

wherein after being reflected by the fourth reflector and the dichroic mirror in turn, the transparent grating image beams are directed to the objective lens.

4. The automatic focusing system of claim 3, wherein the dichroic mirror is a beam splitter or a dichroscope with a light splitting ratio of 50/50.

5. The automatic focusing system of claim 3, further comprising a first beam splitter, wherein the imaging system comprises a first tube lens and a first camera;

after passing through the TIR prism, the first beam splitter and the first tube lens in turn, the two transparent grating image beams are directed to the fourth reflector, and after passing through the objective lens, the dichroic mirror, the fourth reflector, and the first beam splitter in turn, the moiré fringe image generated on the object surface is incident on a photosensitive surface of the first camera.

6. The automatic focusing system of claim 3, further comprising an imaging light source, a second beam splitter, a second tube lens and a second camera;

wherein a light beam emitted by the imaging light source is reflected by the second beam splitter and directed to the dichroic mirror;

the dichroic mirror is configured to perform spectroscopic processing on the illumination beams and direct the illumination beams to the objective lens, the illumination beams passing through the objective lens is projected on the object surface for illuminating an object to be detected on the object surface; and the object to be detected reflects the illumination beams to form a reflected light, and the reflected light converges to the second camera after passing through the objective lens, the dichroic mirror, the second beam splitter and the second tube lens in turn.

7. The automatic focusing system of claim 6, wherein a splitting ratio of the second beam splitter is 50/50.

* * * * *